United States Patent [19]

Rhodes

[11] 4,211,060
[45] Jul. 8, 1980

[54] MOWING ROTOR

[75] Inventor: Keith H. Rhodes, Winneconne, Wis.

[73] Assignee: Hesston Corporation, Hesston, Kans.

[21] Appl. No.: 935,677

[22] Filed: Jun. 21, 1978

[51] Int. Cl.² .................... A01D 55/20; A01D 55/22
[52] U.S. Cl. .................................. 56/294; 56/12.7
[58] Field of Search ............. 56/12.7, 501, 502, 504, 56/505, 294, 295; 172/45

[56] References Cited

U.S. PATENT DOCUMENTS

| | | | |
|---|---|---|---|
| 1,870,932 | 8/1932 | Sternemann | 56/294 |
| 2,509,343 | 5/1950 | Henderson | 56/294 |
| 2,790,293 | 4/1957 | Crotty | 56/294 |
| 2,923,117 | 2/1960 | Henderson | 56/294 |
| 2,941,347 | 6/1960 | Strom | 56/294 |
| 3,335,555 | 8/1967 | Woodring | 56/294 |
| 3,402,541 | 9/1968 | Panek et al. | 56/294 |
| 3,527,038 | 9/1970 | Wood et al. | 56/12.7 |
| 3,606,748 | 9/1971 | Middlesworth | 56/294 |
| 3,831,359 | 8/1974 | Mathews | 56/294 |

FOREIGN PATENT DOCUMENTS 2023525 12/1971 Fed. Rep. of Germany ............ 56/504
1057371 2/1967 United Kingdom ..................... 56/504

*Primary Examiner*—Paul J. Hirsch
*Attorney, Agent, or Firm*—Schmidt, Johnson, Hovey & Williams

[57] ABSTRACT

A flail-type mowing rotor, spinning about a horizontal axis transverse to its path of travel, has specially configured, swingable cutters that provide finish-cut quality notwithstanding design features that minimize the number of cutters required on the rotor, allow them to be fabricated from stamped, relatively light-gauge metal, and promote quick and easy removal and replacement of cutters as may be necessary or desirable. Each of the cutters comprises a pair of back-to-back, generally L-shaped blades having a medially disposed, obliquely oriented offsetting portion that locates the transverse cutting edge in offset relationship to the plane of the flat mounting portion of the blade. Thus, when the blades are disposed back-to-back on the rotor, the transverse cutting edge formed by the two cooperating blades is interrupted at its midpoint to present a gap through which uncut grass may pass as the rotor spins, thereby wiping the cutter clean and eliminating grass wrap.

21 Claims, 5 Drawing Figures

U.S. Patent    Jul. 8, 1980    4,211,060
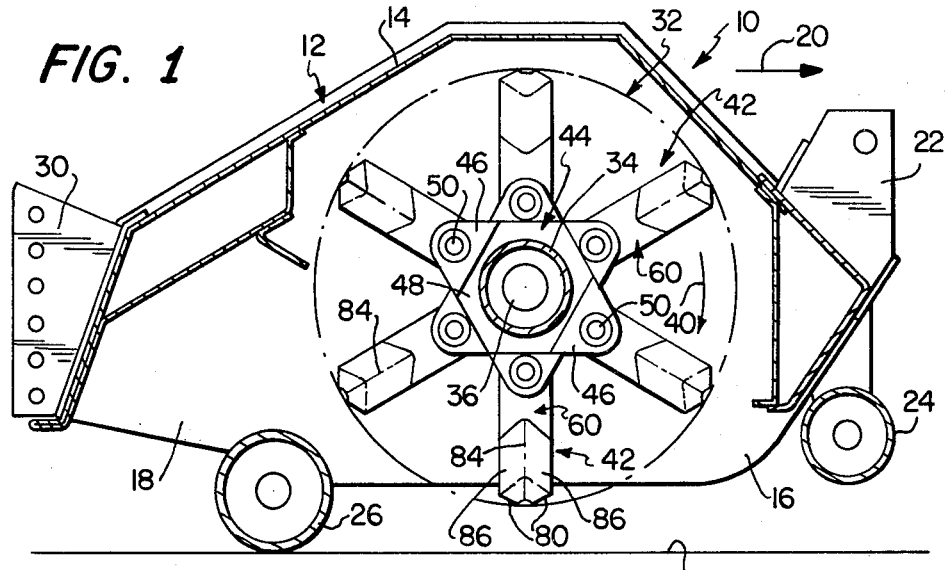
FIG. 1
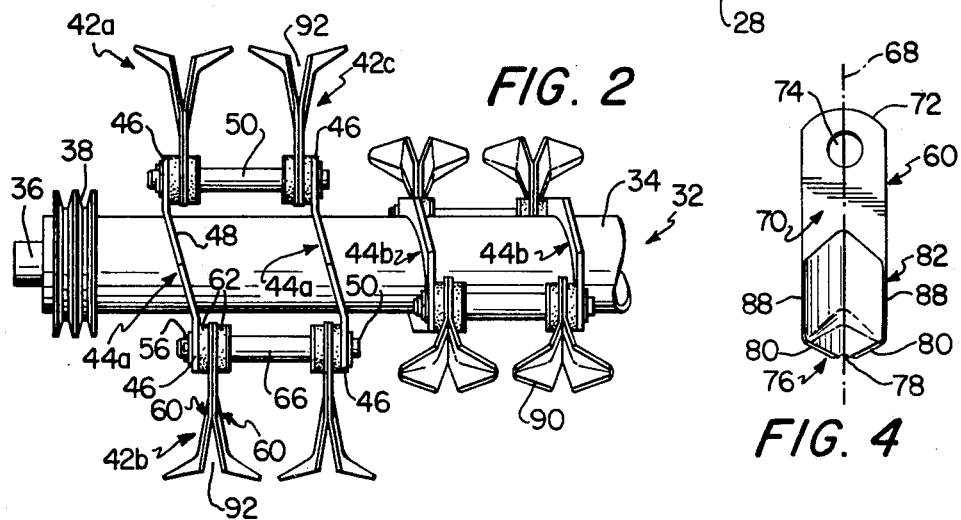
FIG. 2
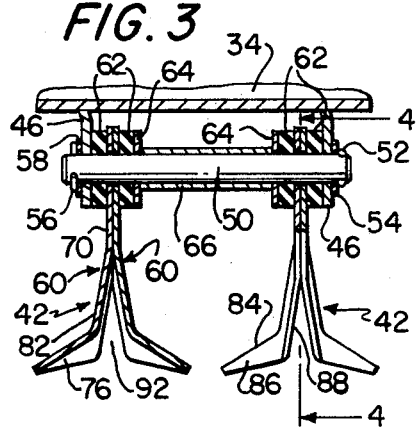
FIG. 3
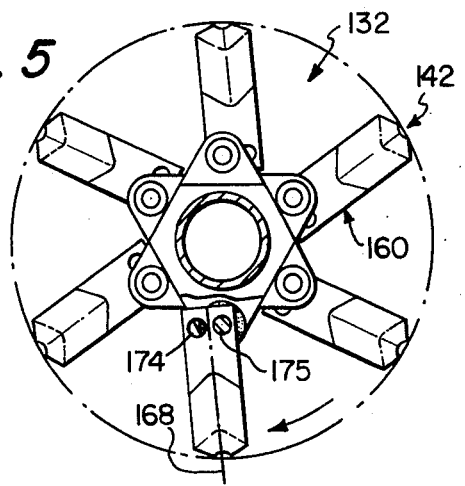
FIG. 4
FIG. 5

MOWING ROTOR

TECHNICAL FIELD

This invention relates to grass-mowing equipment of the type wherein the mowing rotor spins about a horizontal axis transverse to the path of travel of the mower as contrasted, for example, to mowers which employ horizontal blades spinning about a vertical axis.

BACKGROUND ART

Mowers which employ a rotor which spins about a horizontal axis are not per se new in the art. On the other hand, very few have found acceptance as finish-cut mowers capable of providing that quality of lawn mowing necessary for parks, playgrounds, golf courses and the like. Typically, such mowers are more in the nature of rotary choppers used by farmers to chop corn stalks and the like as the unit is towed through the field following corn harvest.

SUMMARY OF THE INVENTION

Hence, an overriding objective of the present invention is to provide a mowing rotor which incorporates the many benefits inherent in rotors employing individual, radially extending cutters yet which raises the cutting performance to such a high level as to render the mower suitable for finish-cut operations where aesthetics are of prime importance.

By the same token, in achieving the foregoing objective, it is important that such factors as manufacturing costs, dynamic balancing, blade replacement, self-cleaning, sharpening ease, safety, and resistance to damage through shock impacts with solid objects all be considered in arriving at the ultimate design.

Generally speaking, the individual cutters are of T-shaped configuration and are swingably attached to the hub of the rotor in such a way that their cutting edge extends generally longitudinally of the axis of rotation of the rotor. Each cutting edge is interrupted at its midpoint by a clearance gap through which uncut grass can pass as the rotor spins, thereby operating to wipe the cutter clean and prevent wrapping of the grass about the cutter. Leaving strips of uncut grass is prevented, however, because the cutters are arranged helically around and along the hub of the rotor in such a way that the cutting edge of one cutter overlaps the gap of a next adjacent cutter in the series. Moreover, cutting edges of adjacent cutters in the series overlap so as to provide a continuous line cut notwithstanding the use of individual cutters and the use of the cleaning gap.

Each of the individual cutters is in actual fact formed by a pair of back-to-back, generally L-shaped blades having a medially disposed, obliquely extending portion that offsets the outermost cutting portion thereof from the plane of the innermost mounting portion. Thus, the obliquely disposed, medial portions of the back-to-back blades diverge as the cutting edge is approached so as to cooperatively define the self-cleaning gap of the cutter.

Each of the blades is stamped from metal plate stock so as to facilitate their manufacture and minimize weight, and a centrally disposed hump along the outside surface of the medial, offsetting portion of each blade and along the upper surface of the cutting portion of each blade has the effect of inducing an uplifting airflow as the rotor spins, thereby lifting the standing grass to assure proper and complete severance. Furthermore, the humped design of the cutting portion contributes to the bottom cutting and bottom sharpening design of each blade by providing an inclined upper surface on the cutting portion that merges with a bottom bevel of the cutting portion at the leading edge thereof.

The cutters are held in their longitudinally offset relationship by mounting plates which circle the hub of the rotor and are rigidly affixed thereto. Cooperating pairs of the plates have mounting pins that span the plates so as to respectively swingably carry pairs of the cutters in longitudinally spaced relationship to each other. Resilient collars yieldably maintain the blades of each cutter in their back-to-back relationship such as to return the blades to their normal relationship in the event that a solid object passes through the gap between the blades and thus forces the blades momentarily apart. Spacer means keep the cutters of each pin in their properly spaced relationship, and all of such hardware is so interrelated that the cutters and blades may be removed and replaced with ease.

Each blade is symmetrical along its longitudinal axis and carries cutting edges along both its normally leading and trailing sides such that the blades may be reversed if so desired.

DESCRIPTION OF THE DRAWING

FIG. 1 is a vertical, cross-sectional view of a mower constructed in accordance with the principles of the present invention and taken longitudinally of the path of travel of the mower;

FIG. 2 is a fragmentary, elevational view of the rotor thereof;

FIG. 3 is an enlarged, fragmentary, cross-sectional view of one pair of cutters and the mounting means associated therewith;

FIG. 4 is a plan view of one of the blades of a cutter taken along the back side thereof substantially along the line 4—4 of FIG. 3; and FIG. 5 is a vertical, cross-sectional view of an alternative embodiment of the rotor in FIG. 1.

DETAILED DESCRIPTION

The mower 10 includes a housing 12 having a closed top 14 which slants downwardly at the front and rear thereof so as to also effectively close said front and rear, an open bottom 16, and a pair of closed sidewalls 18 (only one of said sidewalls 18 being illustrated in the drawing). As shown in FIG. 1, the housing 12 is adapted for advancement in a forward direction indicated by the arrow 20 and may for this purpose be connected to a towing vehicle (not shown) via attaching structure 22 at the front of housing 12. Front and rear transverse rollers 24 and 26 respectively limit the proximity of the housing 12 to the ground 28, and rearwardly disposed gusset structure 30 may be used to support trailing caster wheels (not shown) by which the elevation of the housing 12 can be varied.

The housing 12 encloses a rotor 32 that includes a cylindrical hub 34 having a stub shaft 36 projecting concentrically from each end thereof (only one of the shafts 36 being illustrated) so as to support the rotor 32 within the housing 12 for rotation about an axis transverse to the path of travel of the housing 12, said axis being the longitudinal axis of the hub 34. As illustrated in FIG. 2, a drive sheave 38 may be provided at one end of the hub 34 in rigid connection therewith for supplying driving power to the rotor 32 from mechanism not shown but normally derived from the source of towing power, i.e., from the power takeoff shaft of a towing tractor. Preferably, the rotor 32 is driven in a clockwise direction viewing FIG. 1 as indicated by the arrow 40.

The rotor 32 further includes a number of generally T-shaped cutters 42 that are arranged around the hub 34 and along the latter in a helically extending series. This is shown, for example, in FIG. 2 wherein the leftmost cutter 42a represents the first cutter in the series; the next cutter 42b in the series is disposed slightly to the right thereof; the third cutter 42c in the series is offset slightly to the right of the second cutter 42b, and so on as the right end of the rotor 32 is approached viewing FIG. 2. Thus, it can be said that the cutters 42 are offset longitudinally of one another along the hub 34 with respect to the axis of rotation of the rotor 32.

The cutters 42 are maintained in their longitudinally offset, helically disposed arrangement by specially configured mounting plates 44, each of which is generally diamond-shaped in plan, having a pair of diametrically opposed, radially outwardly extending mounting ears 46 which are disposed in perpendicular relationship to the axis of rotation of the hub 34. The two ears 46 of each plate 44 are interconnected by a central web 48 that is centrally perforated to receive the hub 34. Suitable welds may secure the web 48 to the hub 34 around the central perforation of the web 48, and the latter is disposed in oblique relationship to the longitudinal axis of the hub 34 such that the two ears 46 are disposed in longitudinally offset relationship to one another by an amount depending upon the length of the web 48 and its degree of oblique disposition. Longitudinally adjacent pairs of the plates 44 cooperate to support four of the cutters 42 such as illustrated by the plates 44a in FIG. 2, a similar arrangement being had by the next rightwardly disposed pair of plates 44b in FIG. 2, although the plates 44b are circumferentially offset from the plates 44a by sixty degrees. The next rightwardly disposed pair of plates 44 (not shown) are circumferentially offset sixty degrees from the plates 44b, and so forth, until the rightmost end of the hub 34 is obtained.

The ears 46 of each pair of mounting plates 44 are aligned longitudinally with respect to the axis of the hub 34 so that each longitudinally aligned pair of the ears 46 supports a pivot pin 50 spanning the distance between the ears 46 and projecting slightly beyond the same in parallel relationship to the hub 34. Nibs 52 or other circumferentially disposed protuberances on one end of each pin 50 serve as limit shoulders to prevent axial movement of the pin 50 in one direction through the ears 46, there preferably being a washer 54 between the nibs 52 and the proximal ear 46. At the opposite end of each pin 50, a cotter pin 56 serves to prevent axial movement of the pin 50 in the opposite direction, once again there preferably being a washer 58 between the cotter pin 56 and the proximal ear 46.

A pair of the cutters 42 are carried by each pivot pin 50 at axially spaced locations along the latter for independent swinging movement about the common axis of the pin 50. Each of the cutters 42 includes a pair of back-to-back blades 60, details of which will hereinafter be described, and each pair of said blades 60 is yieldably held in said back-to-back relationship by a pair of resilient, preferably rubber, collars 62 on opposite sides of the cutter 42 bearing against respective ones of the blades 60. One of the collars 62 is disposed between a blade 60 and the proximal ear 46, while the other of the collars 62 is located between the other blade 60 and a load-bearing washer 64 which itself is held in position by the proximal end of a spacer tube 66 which encircles the pin 50 over the central portion thereof and maintains the proper spacial relationship between adjacent cutters 42 along the pin 50.

Each of the blades 60 is preferably fabricated from sheet metal stock of such gauge as to permit cutting and forming of the blades 60 through a simple stamping operation. Each blade 60 has a longitudinal axis 68 as illustrated in FIG. 4 and is provided with a flat mounting portion 70 adjacent the normally innermost end 72 thereof. A hole 74 adapts the blade 60 for swingably receiving the pin 50 in such a way that the latter is presented generally edgewise to the path of rotation of the rotor 32.

Each blade 60 further includes a cutting portion 76 adjacent the opposite, normally outermost end 78 thereof. Cutting portion 76 projects laterally outwardly from the plane of the mounting portion 70 in a disposition that closely approximates a perpendicular relationship. The cutting portion 76 tapers toward a reduced, transverse, cross-sectional dimension as the outermost end 78 is approached and thus presents a pair of converging, leading and trailing edges 80 which also serve as cutting edges.

An intermediate offsetting portion 82 integrally joins the cutting portion 76 with the mounting portion 70 and offsets the cutting edges 80 wholly to one side of the plane of the mounting portion 70 in laterally spaced relationship to the latter. The offsetting portion 82 extends obliquely outwardly of the plane of the mounting portion 70 to effect said offsetting of the cutting portion 76, and the entirety of the blade 60 from the outermost end 78 inwardly along the cutting portion 76 and the offsetting portion 82, but exclusive of the mounting portion 70, is formed in a concavol-convex manner so as to yield a humped appearance to the upper surface of the cutting portion 76 and the laterally outer surface of the offsetting portion 82. Hence, a ridge 84 extends along the cutting portion 76 and the offsetting portion 82 coinciding with the longitudinal axis 68 so as to present oppositely inclined faces 86 diverging from the ridge 84 and terminating at the leading and trailing edges respectively of the blade 60. In the case of the cutting portion 76, the faces 86 terminate at the cutting edges 80, while in the case of the offsetting portion 82, the faces 86 terminate at blunt or non-cutting edges denoted by the numeral 88.

As a result of the transversely humped configuration of the cutting portion 76, the latter is ideally suited for bottom cutting and bottom sharpening. To this end, the bottom of the cutting portion 76 is beveled as at 90 to produce a flat bottom to the cutting portion 76 along the peripheral margins of the latter, the bevel 90 and the faces 86 thus intersecting at an angle substantially less than ninety degrees so as to provide the desired cutting capability.

By virtue of the tapered nature of the cutting portion 76, the cutting edges 80 recede from the leading and trailing extremities of the blade 60 as the outer end 78 is approached. This assists in rendering the blade 60 self-cleaning. Of additional assistance in regard to self-cleaning is the fact that, because each cutter 42 is comprised of a pair of the blades 60 disposed back-to-back, the diverging offsetting portions 82 cooperate to produce a generally V-shaped gap 92 between the blades 60 radially outboard of the flat mounting portions 70.

As will subsequently be made apparent, the gap 92 is quite significant insofar as self-cleaning of the cutters 42 is concerned because the gap 92 allows uncut grass to pass between the blades 60 and wipe the latter clean as the rotor 32 spins.

As a result of the specially formed configuration of each of the blades 60, it may be seen that the cutters 42 are provided with corresponding mounting portions, offsetting portions and cutting portions. The outermost cutting edge of each cutter 42, as defined by the cutting edges 80, is rendered discontinuous by virtue of the centrally disposed gap 92, but this is not in any way detrimental to the cutting quality available from the rotor 32 because, as shown in FIG. 2, the gap 92 of each cutter 42 is overlapped by a cutting edge 80 of the next cutter 42 in the helical series of cutters 42 about the hub 34. Moreover, the cutting portions 76 of the cutters 42 overlap one another in a longitudinal direction with respect to the axis of rotation of the rotor 32 so that the cut afforded by the rotor 32 is indeed continuous and uninterrupted all along the length of the rotor 32 when the latter is in operation.

FIG. 5 shows an alternative embodiment wherein a rotor 132 is provided with cutters 142 having blades 160 provided with a pair of alternative mounting holes 174 and 175 located on opposite sides of the longitudinal axis 168 of each blade 160. Hence, each of the blades 160 may be suspended in a slightly retarded condition as illustrated in FIG. 5 if such is desired by using the mounting hole 175. If the blade 160 is then reversed for any reason, a retarded condition may still be obtained by using the mounting hole 174.

OPERATION

As shown in FIG. 1, rotation of the rotor 32 is in the so-called "Down-Mill" direction for increased operator safety, i.e., the cutters 42 are moving downwardly in their respective paths of travel at the leading extremity of the rotor 32. Although the cutters 42 are swingably mounted so as to be of the "flail" type, it will, of course, be appreciated that centrifugal force causes them to extend essentially truly radially as shown in FIG. 1 when the rotor 32 is spinning.

Hence, as the mower 10 moves along the path of travel 20, uncut grass is presented to the rotor 32 through the open bottom 16 of the housing 12 where it is severed by the cutting edges 80 of the various cutters 42. The transversely humped configuration of the cutting portions 76 has the effect of creating a lifting air current through the housing 12 such that the grass is encouraged to stand all the more upright and be severed at the desired height.

As the downwardly sweeping cutters 42 move through the standing grass, the gaps 92 between the back-to-back blades 60 allow standing grass in that vicinity to pass between the blades 60, thereby wiping the blades 60 clean and preventing grass wrap. Hence, the cutters 42 are essentially self-cleaning.

Notwithstanding the cleaning action afforded by standing grass moving through the gaps 92, such grass is immediately thereafter severed by a trailing cutter 42 in view of the longitudinally offset nature of the cutters 42 whereby the gap 92 of one cutter 42 in the series is overlapped by a cutting edge 80 of an immediately trailing cutter 42 in the series. Thus, efficient self-cleaning action is obtained without sacrificing that degree of cutting performance necessary to obtain a finish-cut appearance to the lawn, acreage or other tract of land being mowed.

In the event that a solid obstruction should be encountered by any one of the cutters 42, such cutter 42 can immediately swing back in a retrograde swinging motion about the pin 50 so as to resist breakage. Likewise, any one of the individual blades 60 can swing back relative to its partner in defining the corresponding cutter 42 because the blade pairs are not physically interlocked with one another.

In the event that an obstruction is forced through the gap 92, the resilient collars 62 permit the two blades 60 of each cutter 42 to separate momentarily to the extent required to pass the object, whereupon the collars 62 return the blades 60 to their normal back-to-back disposition.

It is important to recognize that all of the blades 60 are identical to one another, notwithstanding the fact that certain of the blades 60 have their cutting portions 76 extending in one longitudinal direction while certain others have their cutting portions 76 extending in the opposite longitudinal direction. Each of the blades 60 is symmetrical about its longitudinal axis 68, and for this reason, as well as because the cutting edges 80 are indeed disposed along both opposite edges of the blades 60, the blades 60 may be reversed if, for example, one cutting edge is becoming worn while the other has not yet been dulled. Moreover, during assembly, there need be no concern with respect to which is a "right hand" blade and which is a "left hand" blade; it is but necessary to select any blade from a collection thereof and place it in either of the leftwardly or rightwardly extending disposition as may be necessary.

With respect to disassembly and replacement, although the nibs 52 and the cotter pin 56 associated with each pivot pin 50 firmly retain the latter against axially displacement, it will be appreciated that removal and replacement is indeed an easy job. Upon deforming the cotter pin 56 so as to permit its removal from its transversely disposed bore (not shown) through the pivot pin 50, the latter may then be pulled from the ears 46 in a rightward direction viewing FIG. 3 so as to permit the removal of the two cutters 42 and their associated mounting and spacing structure, i.e., the spacer tube 66, the collars 62, the washers 64 and the washers 54, 58. Thereupon, new blades 60 or complete new cutters 42 may be slipped onto the pivot pin 50 in association with the mounting and spacing structure therefor when the pin 50 has first been inserted through the right ear 46 as viewed in FIG. 3. Then, simply replacing the left end of the pin 50 into the left ear 46 and inserting the cotter pin 56 reestablishes these parts in their operating condition.

By virtue of the fact that the cutters 42 are beveled along the bottoms thereof, resharpening is simplified since such may be carried out with the rotor spinning. Manifestly, the time and effort required to accomplish this task are therefore greatly reduced.

I claim:

1. A flail-type mowing blade comprising:
   a planar mounting portion adjacent one end of the blade;
   a transverse cutting portion adjacent the opposite end of the blade projecting outwardly from the plane of said mounting portion and having a transversely disposed cutting edge along the normally leading side thereof and extending inwardly from said opposite end; and
   an offsetting portion joining said cutting portion to the mounting portion in laterally offset relationship thereto, both the inner and outer terminal ends of said cutting edge being located wholly to one side of said mounting portion in spaced relationship to said plane thereof.

2. A mowing blade as claimed in claim 1, wherein said cutting portion is provided with a second cutting edge along the normally trailing side thereof to permit reversal of the blade.

3. A mowing blade as claimed in claim 2, wherein said cutting portion is provided with a transversely humped configuration, having a pair of oppositely inclined upper faces which diverge from a common central ridge along the longitudinal axis of the blade and terminate in respective ones of said cutting edges.

4. A mowing blade as claimed in claim 3, wherein said offsetting portion is provided with a transversely humped configuration, having a pair of oppositely inclined upper faces which diverge from a common central ridge along the longitudinal axis of the blade and terminate in respective non-cutting edges along the normally leading and trailing sides of the offsetting portion, respectively.

5. A mowing blade as claimed in claim 3, wherein said cutting portion is beveled across the bottom thereof to form said cutting edges at the intersection of the bevel with said inclined upper faces.

6. A mowing blade as claimed in claim 3, wherein said cutting portion tapers transversely thereof toward a reduced dimension as said opposite end of the blade is approached.

7. A mowing blade as claimed in claim 1, wherein said mounting portion, said cutting portion and said offsetting portion comprise integrally connected portions of a formed metal plate.

8. In a mowing rotor having a plurality of cutters extending generally radially outwardly from a hub of the rotor, the improvement comprising:
each of said cutters having a normally innermost mounting portion by which the cutter is secured to the hub, a transversely disposed, normally outermost cutting portion having a cutting edge that extends generally longitudinally of the rotor, and an intermediate offsetting portion by which said cutting edge is rendered discontinuous and is maintained in a pair of longitudinally offset, spaced parts on opposite sides of the plane of the mounting portion,
said offsetting portion defining a gap between said parts of the cutting edge and through which uncut material may pass so as to assist in cleaning cut material from the cutter,
each said part of the cutting edge having both inner and outer terminal ends thereof located wholly to one respective side of the mounting portion in spaced relationship to the plane thereof.

9. In a mowing rotor as claimed in claim 8, wherein each of said cutters comprises a pair of individual back-to-back blades, each having its own mounting portion, cutting portion consisting of one of said cutting edge parts, and offsetting portion placing the corresponding cutting edge part in offset relationship to the plane of the corresponding mounting portion.

10. In a mowing rotor as claimed in claim 8, wherein said offsetting portion includes a pair of parts that diverge from said mounting portion and terminate at respective ones of said cutting edge parts.

11. In a mowing rotor as claimed in claim 8, wherein said cutters are arranged about said hub in a helically extending series such that each cutter in the series is offset from a next adjacent cutter in the series in a longitudinal direction relative to the axis of rotation of the rotor, said gap between the cutting edge parts of each cutter being circumferentially aligned with a cutting edge part of a next adjacent cutter in the series.

12. In a mowing rotor as claimed in claim 11, wherein the cutting edges of next adjacent cutters in the series overlap in a longitudinal direction relative to the axis of rotation of the rotor.

13. In a mowing rotor as claimed in claim 8, wherein each of said cutters is swingably secured to the hub for swinging movement about an axis that parallels the axis of rotation of the rotor.

14. In a mowing motor as claimed in claim 13, wherein said cutters are arranged about the hub in diametrically opposed sets of two cutters each, the two cutters of each set being swingable about a common axis.

15. In a mowing rotor as claimed in claim 14, wherein the cutters are also arranged about the hub in a helically extending series such that each cutter in the series is offset from a next adjacent cutter in the series in a longitudinal direction relative to the axis of rotation of the rotor, said gap between the cutting edge parts of each cutter being circumferentially aligned with a cutting edge part of a next adjacent cutter in the series.

16. In a mowing rotor having a plurality of flail-type cutters swingably mounted on a hub of the rotor and projecting generally radially outwardly from the latter, the improvement comprising:
a number of mounts spaced apart longitudinally along the hub and projecting radially outwardly therefrom;
pivot pins spanning the distance between adjacent mounts and supported by the latter in parallel relationship with the axis of rotation of the rotor;
means releasably holding the pins on the mounts against axial removal;
a pair of cutters swingably supported by each pivot pin; and
structure maintaining each pair of cutters in longitudinally spaced apart relationship along the corresponding pivot pin,
said structure including a tubular spacer surrounding the pivot pin between the pair of cutters,
said structure further including a pair of resilient collars about said pin and on opposite sides of each cutter respectively, one of said collars for each cutter being located between the corresponding mount and the cutter and the other collar for each cutter being located between the proximal end of the spacer and the cutter.

17. In a mowing rotor as claimed in claim 16, wherein said structure further includes a load-receiving washer bearing against the proximal end of the spacer on the one hand and against the proximal collar on the other hand.

18. In a mowing rotor having a plurality of flail-type cutters swingably mounted on a hub of the rotor and projecting generally radially outwardly from the latter, the improvement comprising:
a number of mounts spaced apart longitudinally along the hub and projecting radially outwardly therefrom;
pivot pins spanning the distance between adjacent mounts and supported by the latter in parallel relationship with the axis of rotation of the rotor;

means releasably holding the pins on the mounts against axial removal;

a pair of cutters swingably supported by each pivot pin; and structure maintaining each pair of cutters in longitudinally spaced apart relationship along the corresponding pivot pin, each of said cutters including a pair of back-to-back blades individually mounted on said pin, said structure including means for maintaining said blades in said back-to-back relationship, said back-to-back maintaining means including a pair of resilient collars receiving the pair of blades therebetween, one of the collars being disposed between the proximal mount and one of the blades and the other of the collars being disposed between the proximal end of the spacer and the other of said blades.

19. In a mowing rotor as claimed in claim 18, wherein said structure further includes a load-receiving washer bearing against the proximal end of the spacer on the one hand and against the proximal collar on the other hand.

20. In a mowing rotor having a plurality of flail-type cutters swingably mounted on a hub of the rotor and projecting generally radially outwardly from the latter, the improvement comprising:

a number of mounts spaced apart longitudinally along the hub and projecting radially outwardly therefrom;

pivot pins spanning the distance between adjacent mounts and supported by the latter in parallel relationship with the axis of rotation of the rotor;

means releasably holding the pins on the mounts against axial removal;

a pair of cutters swingably supported by each pivot pin; and structure maintaining each pair of cutters in longitudinally spaced apart relationship along the corresponding pivot pin, each of said mounts comprising a perforated plate transversely receiving said hub and rigidly affixed thereto for rotation therewith, each of said plates including a pair of oppositely radially extending ears disposed in perpendicular relationship to the axis of rotation of the rotor, each of said plates further including an obliquely disposed central web interconnecting said ears and locating the same in longitudinally offset relationship to one another with respect to the axis of rotation of the rotor, there being one of said pins for each pair of longitudinally aligned ears whereby the cutters of one pair of ears are offset in a longitudinal direction from the cutters of a circumferentially spaced next pair of longitudinally aligned ears.

21. In a mowing rotor as claimed in claim 20, wherein said plates are arranged in circumferentially offset pairs along the hub so that while the ears of the plates of each pair are longitudinally aligned, the ears of adjacent plate pairs are circumferentially offset from one another.

* * * * *